INVENTOR.
E. V. Briscoe

UNITED STATES PATENT OFFICE 2,316,397

ADJUSTABLE DRAFT CONNECTION UNIT FOR IMPLEMENTS

Ernest V. Briscoe, Kerman, Calif.

Application July 14, 1941, Serial No. 402,319

2 Claims. (Cl. 280—33.11)

This invention relates to tractor drawn implements and particularly to a draft connection unit between the tractor and an earth working implement, such as a ditch digger and cleaner, as shown for instance in my Patent No. 2,136,911, and which operates in and is supported on the bottom of the ditch.

When cleaning drainage ditches and the like it is usually feasible to run the tractor in the ditch along with the cleaner, if the width of the ditch at the bottom is not less than the overall width of the tractor. However, ditches are sometimes of insufficient width to receive the tractor, even though the latter cannot straddle the ditch, and under these conditions it is necessary to dispose the tractor on the bank to one side or the other of the machine working in the ditch.

It is for such conditions that the structure of the present invention is particularly intended, and my principal object is to provide a draft connection unit between the tractor and the implement so arranged with tiltable wheels that the side pull on the implement, due to the laterally and vertically offset position of the tractor relative to the implement in the ditch, will not tend to pull the implement up the sloping sides of the ditch and thereby disturb its proper functioning.

The draft connection unit includes a steerable wheel truck supporting the frame of the implement at its forward end and a tongue projecting forwardly from the truck for connection with the tractor.

Another object of my invention is to provide an adjustable connection means between the tongue and the truck so arranged that the tongue may be disposed at different lateral angles relative to the truck, and still be maintained rigid therewith as against relative movement in a horizontal plane only. In this manner the truck and implement attached thereto may be steered by the turning of the tractor as the contour of the ditch may require, regardless of variations in the level between the truck and tractor.

While particularly intended for use with ditching operations, my device may be used wherever it is desirable or necessary to dispose the tractor to one side of the implement being pulled thereby.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
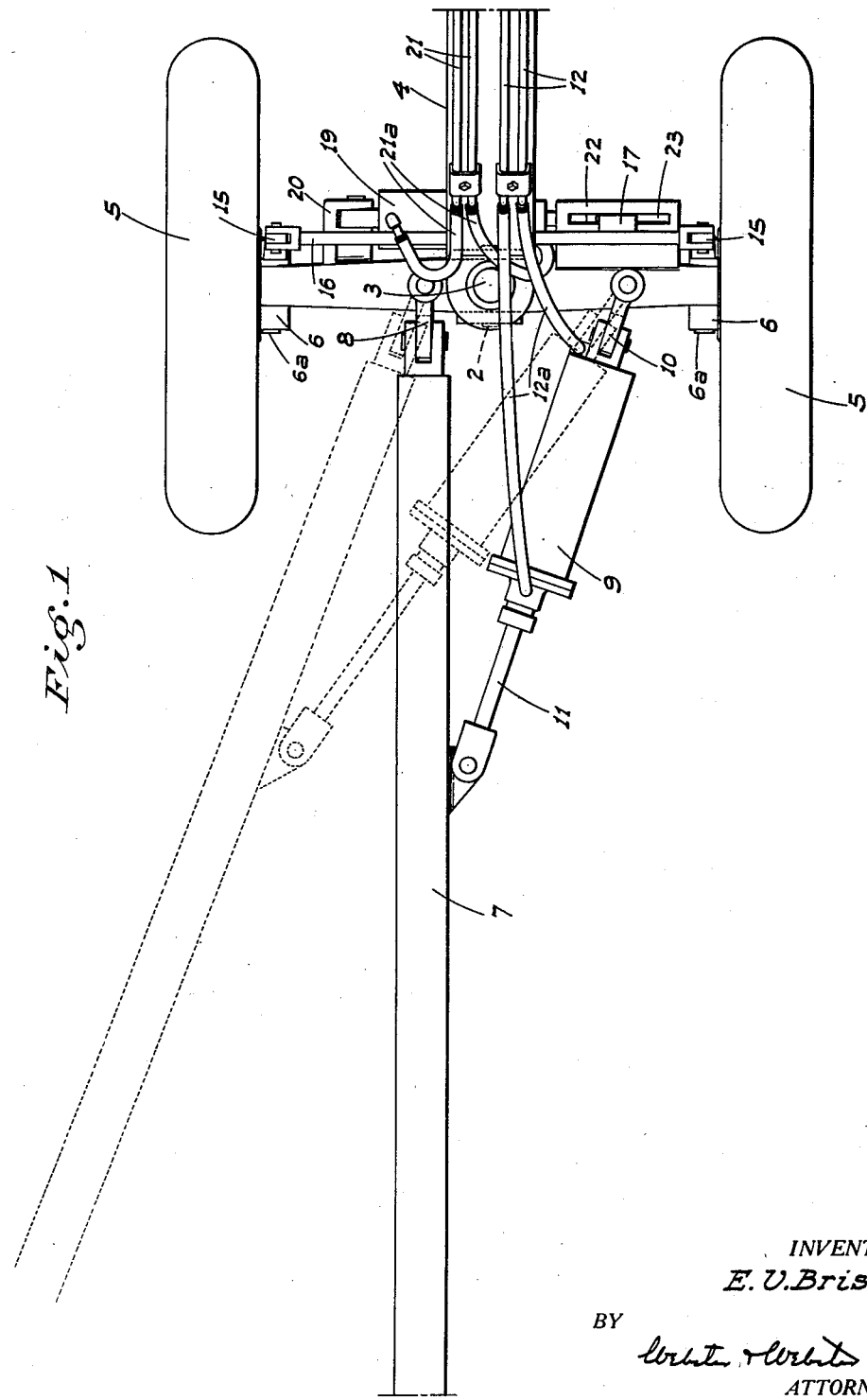
Figure 1 is a plan view of my improved draft connection unit, showing an angled position of the tongue in dotted lines.
Figure 2:
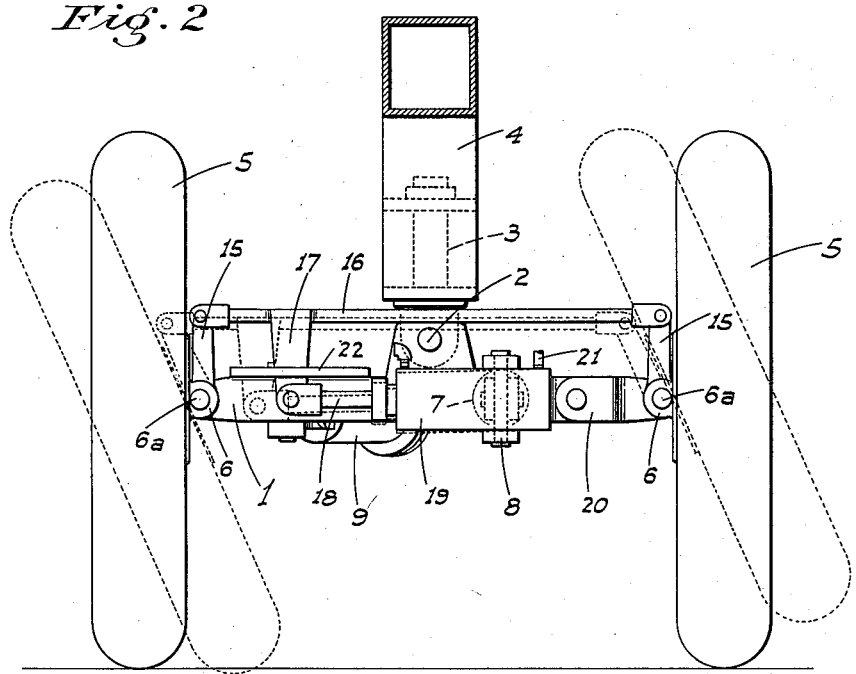
Figure 2 is a rear end elevation of the same showing the canted or tilted position of the wheels in dotted lines.

Referring now more particularly to the characters of reference on the drawings, the draft connection unit comprises a wheel truck which includes an axle 1 connected by a horizontal pin 2 to a vertical upstanding kingpin 3 which is turnable in the forward end of the rearwardly extending central frame beam 4 of the implement. The axle may thus swing in a horizontal plane and also tilt in a transverse vertical plane. Wheels 5 are connected to the ends of the axle by horizontally disposed knuckles 6 which include knuckle pins 6a horizontal or parallel to the pin 2.

Figure 3:
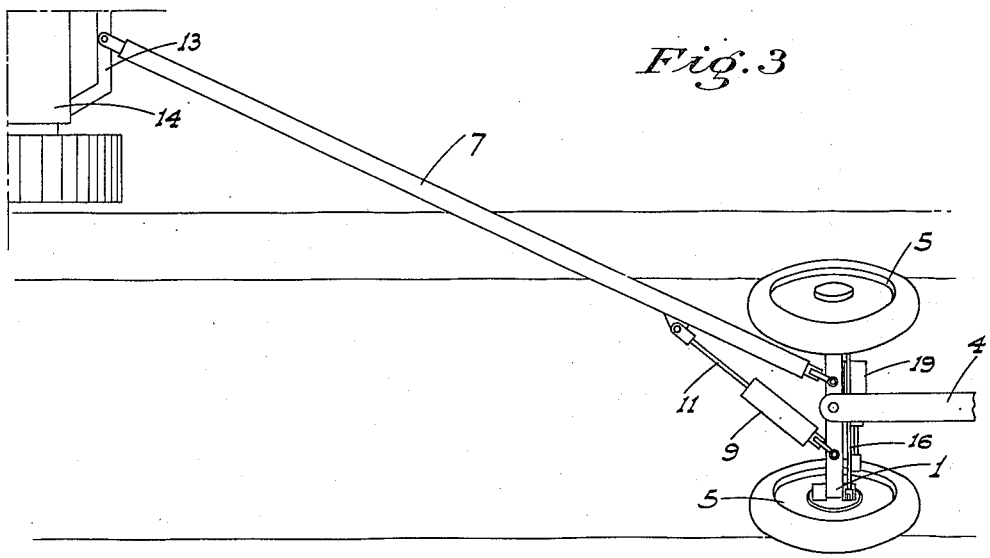
Figure 3 is a diagrammatic plan showing the wheel truck in a ditch and connected to a tractor on the back of the ditch.

A rigid tongue 7 projects forwardly from the axle adjacent its center of length, being connected to said axle by a coupling 8 mounted on the axle for swivel movement in a horizontal plane and on the tongue for relative swivel movement in a vertical plane. A hydraulic unit connects the axle and tongue on one side thereof, said unit comprising a cylinder 9 connected by a coupling 10 to the axle for movement corresponding to that of the tongue, and a piston rod 11 projecting from the cylinder and swivelly connected to the tongue intermediate its ends. Fluid is supplied to the cylinder to control the movement of the piston rod and hold the same stationary at any position by means of conduits 12 extending in the present instance along the beam 4 and which include flexible portions 12a adjacent th cylinder. It will therefore be seen that admitting fluid to one end or the other of the cylinder, the tongue may be swung to one side or the other of the longitudinal plane of the ditch or the travel of the implement, so as to dispose the forward end of the tongue in position for connection to the drawbar 13 of a tractor 14 disposed well to one side of the implement, as indicated in Fig. 3. At the same time a horizontal swing of the tongue imparts steering movement of the truck, and due to the flexible connection of the tongue and cylinder with the axle, said tongue may swing up and down without restraint, as the relative level of the ground on which the truck and tractor rest may necessitate.

Knuckle arms 15 project upwardly from the knuckles 6 behind the axle is being connected by a tie rod 16. An ear or plate 17 is rigid with and depends from the tie-rod adjacent one end and is connected on its lower end to the piston rod 18 of a hydraulic cylinder 19 which extends transversely of and behind the axle and is connected thereto at its end opposite the piston rod by a suitable bracket 20. Fluid is fed to this cylinder to control the movement of the piston rod in either direction by conduits 21 extending along the beam 4, and which include flexible portions 21a adjacent the cylinder. By means of this arrangement it will be seen that the wheels may be set and held against lateral tilting or canting to one side or the other, and depending on the direction of angularity of the tongue; the purpose being to so dispose the wheels relative to the tongue that the lateral pull on the truck, due to the angularity of the line of draft, will not cause the wheels to ride up the sides of the ditch. To this end the wheels are canted so that the bottom of that wheel on the side of the truck toward which the tongue slants, is disposed laterally out from its normal position, as shown in Fig. 3.

In order to prevent excessive canting of the wheels in the event that the fluid in the cylinder 19 is entirely relieved, the ear 17 passes through a slotted guide plate 22 secured on the axle, the length of the slot 23 in said plate determining the possible extent of movement of the ear and tie-rod in opposite directions from the normal position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A draft connection for an implement wheel truck, the truck having an axle mounted for steering movement about a vertical axis centrally between the ends of said axle, said connection comprising a draft tongue projecting forwardly from the axle, a double-acting hydraulic cylinder pivoted at one end on the tongue intermediate the ends of the latter and for swinging movement in a plane parallel thereto, said cylinder extending rearwardly to the axle in diverging relation to the tongue, means to actuate said hydraulic cylinder, means swivelly connecting the rear end of the tongue to the axle intermediate one end of the latter and said vertical axis, and other means swivelly connecting the rear end of said hydraulic cylinder to the axle intermediate the other end of the latter and said vertical axis.

2. In a wheel truck assembly for implements, an axle having a pair of wheels supported by the axle and mounted thereon for canting movement transversely of the direction of travel, means including a tie rod connecting the wheels together for simultaneous parallel canting movement, said tie rod being parallel to the axle, an extensible hydraulic unit extending lengthwise of and substantially parallel to the tie rod but in spaced relation thereto, means connecting the hydraulic unit at one end on the axle, an ear fixed on and projecting laterally from said tie rod toward and to a point adjacent the other end of said hydraulic unit, means pivotally connecting the ear and said other end of the unit, and a combination guide and stop plate fixed on the axle between said rod and unit in facing relation thereto, said plate having a slot therethrough lengthwise of the rod and unit, and through which slot the ear projects in guided and travel-limiting relation.

ERNEST V. BRISCOE.